US011450992B2

(12) United States Patent
Trenbath et al.

(10) Patent No.: US 11,450,992 B2
(45) Date of Patent: Sep. 20, 2022

(54) PLUG LOAD MANAGEMENT SYSTEM WITH LOAD IDENTIFICATION (71) Applicant: Alliance for Sustainable Energy, LLC, Golden, CO (US)

(72) Inventors: Thien-Kim Leckie Trenbath, Boulder, CO (US); William Cook Livingood, III, Lakewood, CO (US); Amy LeBar, Golden, CO (US); Bennett R. Doherty, Bedford, NH (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 62 days.

(21) Appl. No.: 17/198,721

(22) Filed: Mar. 11, 2021

(65) Prior Publication Data
US 2021/0288451 A1  Sep. 16, 2021

Related U.S. Application Data (60) Provisional application No. 62/987,936, filed on Mar. 11, 2020.

(51) Int. Cl.
*H01R 13/66* (2006.01)
(52) U.S. Cl.
CPC ..... *H01R 13/6691* (2013.01); *H01R 13/6683* (2013.01)
(58) Field of Classification Search
CPC .......................... H01R 13/6691; H01R 13/6683
See application file for complete search history.

(56) References Cited

U.S. PATENT DOCUMENTS

| 4,977,515 | A | * | 12/1990 | Rudden ............. G05D 23/1913 340/3.31 |
|---|---|---|---|---|
| 7,817,014 | B2 | | 10/2010 | Krishna et al. |
| 7,847,562 | B2 | | 12/2010 | Montgomery et al. |
| 8,000,074 | B2 | | 8/2011 | Jones et al. |
| 8,229,602 | B2 | | 7/2012 | Montgomery et al. |
| 8,461,725 | B1 | | 6/2013 | Stubbs et al. |
| 8,763,903 | B2 | | 7/2014 | Moran et al. |
| 9,231,351 | B2 | | 1/2016 | Chung et al. |
| 9,563,792 | B2 | | 2/2017 | Allen et al. |
| 10,342,103 | B2 | | 7/2019 | Newman, Jr. et al. |
| 10,355,921 | B2 | | 7/2019 | Turvy, Jr. et al. |
| 10,420,194 | B2 | | 9/2019 | Mann et al. |

(Continued)

FOREIGN PATENT DOCUMENTS

| CA | 2 341 676 C | 6/2005 |
|---|---|---|
| CA | 2 587 965 A1 | 11/2007 |

(Continued)

OTHER PUBLICATIONS

Doherty et al., "Device-level plug load disaggregation in a zero energy office building and opportunities for energy savings", Energy and Buildings, Dec. 1, 2019, vol. 204, pp. 1-14.

(Continued)

*Primary Examiner* — Gary F Paumen
(74) *Attorney, Agent, or Firm* — Alexandra M. Hall (57) ABSTRACT

The present disclosure relates to a plug load management system having automatic and dynamic load detection, meaning it has the ability to identify devices that are plugged into outlets of a building and determine the location of the plug load down to the specific outlet. When a device is moved, the plug load management system can determine this change and update accordingly.

20 Claims, 5 Drawing Sheets

(56) References Cited

U.S. PATENT DOCUMENTS

| | | | | |
|---|---|---|---|---|
| 10,432,258 B1* | 10/2019 | Mitchell | ............... | H04B 3/546 |
| 10,470,279 B1 | 11/2019 | Fultz et al. | | |
| 10,624,184 B2 | 4/2020 | Newman, Jr. et al. | | |
| 2013/0184886 A1* | 7/2013 | Pollack | ............... | G06Q 50/06 |
| | | | | 700/291 |
| 2017/0324195 A1* | 11/2017 | Eriksen | ............... | H01R 24/78 |
| 2018/0203591 A1 | 7/2018 | Callen et al. | | |
| 2019/0181638 A1 | 6/2019 | Chapel et al. | | |
| 2020/0212959 A1* | 7/2020 | Eriksen | ............... | H02H 1/0092 |
| 2020/0328586 A1* | 10/2020 | Eriksen | ............... | H02H 3/335 |

FOREIGN PATENT DOCUMENTS

| | | |
|---|---|---|
| CA | 2 754 877 A1 | 4/2012 |
| CN | 110268805 A | 9/2019 |
| WO | 2018/053644 A1 | 3/2018 |

OTHER PUBLICATIONS

Kandt et al., "Plug Load Management System Field Study", Feb. 2019, available at https://www.nrel.gov/docs/fy19osti/72028.pdf, pp. 1-72.

Langner et al., "Integrating Smart Plug and Process Load Controls into Energy Management Information System Platforms: A Landscaping Study", NREL Technical Report, NREL/TP-5500-74080, Jun. 2019, pp. 1-37.

Trenbath et al., "Emerging Technologies for Improved Plug Load Management Systems: Learning Behavior Algorithms and Automatic and Dynamic Load Detection", ACEEE Summer Study on Energy Efficiency in Buildings 2020, available at https://aceee2020.conferencespot.org/event-data/pdf/catalyst_activity_10696/catalyst_activity_paper_20200812131044344_546d2a5b_29c8_4104_924e_f0370bee70f0, pp. 3-409-3-424.

* cited by examiner

FIG. 5

PLUG LOAD MANAGEMENT SYSTEM WITH LOAD IDENTIFICATION

CROSS-REFERENCE TO RELATED APPLICATIONS

This application claims priority from U.S. Provisional Patent Application No. 62/987,936 filed on Mar. 11, 2020, the contents of which are incorporated herein by reference in their entirety.

CONTRACTUAL ORIGIN

This invention was made with government support under Contract No. DE-AC36-08GO28308 awarded by the U.S. Department of Energy. The United States government has certain rights in this invention.

SUMMARY

An aspect of the present disclosure is a system for plug load management, the system includes at least one of a tag connected to a receptacle including an identifier assigned to the receptacle, a reader connected to the plug load, and a processor, wherein the plug load is connected to the receptacle, the tag is configured to provide the identifier to the reader, the plug load is configured to send the identifier to the processor, the processor is configured to determine the receptacle the plug load is plugged in to from the identifier. In some embodiments of the present disclosure, the tag is a radio frequency identification (RFID) tag, and the reader is a RFID reader. In some embodiments of the present disclosure, the receptacle is an electrical outlet. In some embodiments of the present disclosure, the receptacle is a universal serial bus (USB) outlet. In some embodiments of the present disclosure, the processor contains a database which associates the identifier with the receptacle. In some embodiments of the present disclosure, the plug load comprises a smart device capable of communicating with the processor using a form of wireless communication. In some embodiments of the present disclosure, the processor is configured to send an instruction to the plug load.

An aspect of the present disclosure is a system for plug load management, the system including at least one of a plug load having a power over ethernet (PoE) connector, a PoE receptacle having an identifier, and a processor, wherein the plug load is connected to the PoE receptacle via the PoE connector, the PoE receptacle is configured to communicate the identifier to the plug load, the plug load is configured to communicate the identifier to the processor, and the processor is configured to determine the receptacle based on the identifier. In some embodiments of the present disclosure, the processor contains a database which associates the identifier with the receptacle. In some embodiments of the present disclosure, the plug load comprises a smart device configured to communicate with the processor using a form of wired communication. In some embodiments of the present disclosure, the processor is configured to send an instruction to the plug load.

An aspect of the present disclosure is a method including providing an identifier via a tag to a reader when a plug load is connected to a receptacle, communicating the identifier to a processor via the plug load, identifying the receptacle to which the plug load is connected based on the identifier, and sending an instruction to the plug load. In some embodiments of the present disclosure, the providing comprises using a form of near field communication (NFC). In some embodiments of the present disclosure, the form of NFC comprises radio frequency identification (RFID). In some embodiments of the present disclosure, before the providing the method includes recording the identifier and the receptacle in a database within the processor. In some embodiments of the present disclosure, the determining includes receiving the identifier, and searching the database for the identifier, wherein the database connects the identifier to the receptacle. In some embodiments of the present disclosure, the plug load is a smart device capable of communicating with the processor wirelessly. In some embodiments of the present disclosure, the sending includes at least one of directing the plug load to reduce its energy usage, directing the plug load to power off, and/or directing the plug load to enter standby mode.

BACKGROUND

Plug loads refer to all appliances or equipment that are plugged into standard 120 V electrical outlets of buildings that are not associated with other major building end uses, such as lighting, ventilation, heating, cooling, or water heating. Plug loads are responsible for a significant and growing portion of energy consumed in commercial buildings. The Energy Information Agency estimates that plug loads make up approximately 47% of total energy use in commercial buildings. However, the distributed and ever-changing nature of plug loads makes them one of the most challenging building applications to manage. Thus, there remains a need for improved systems and methods for monitoring and managing plug loads.

BRIEF DESCRIPTION OF DRAWINGS

Some embodiments are illustrated in referenced figures of the drawings. It is intended that the embodiments and figures disclosed herein are to be considered illustrative rather than limiting.

REFERENCE NUMERALS

100 . . . plug load (PL) management system
105 . . . receptacle
110 . . . tag
115 . . . connector
120 . . . reader
125 . . . plug load
130 . . . processor 305 . . . hub
500 . . . method
505 . . . providing
510 . . . identifying
515 . . . sending

DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Among other things, the present disclosure relates to a plug load (e.g., appliances, electronics, tools, etc.) management system which may locate and identify plug loads in a building by determining the specific outlet to which the plug load is connected. Once the plug loads have been located and identified by the plug load (PL) management system, the system can, among other things, monitor and/or control the energy utilization of the plug loads. For example, a PL management system may control the overall energy usage of the plug loads within a building by directing the performance of one or more plug loads. In some embodiments of the present disclosure, a PL management system may control the duration of operation and/or operating status of plug loads in heavy-traffic areas and/or prioritize the use of essential PLs when attempting to reduce the power utilization of a plurality of plug loads. Among other things, the systems and methods described herein allow for the identification and/or location of one or more plug loads to their specific electrical outlets, enabling highly accurate and detailed control of the energy usage of plug loads.

Figure 1:
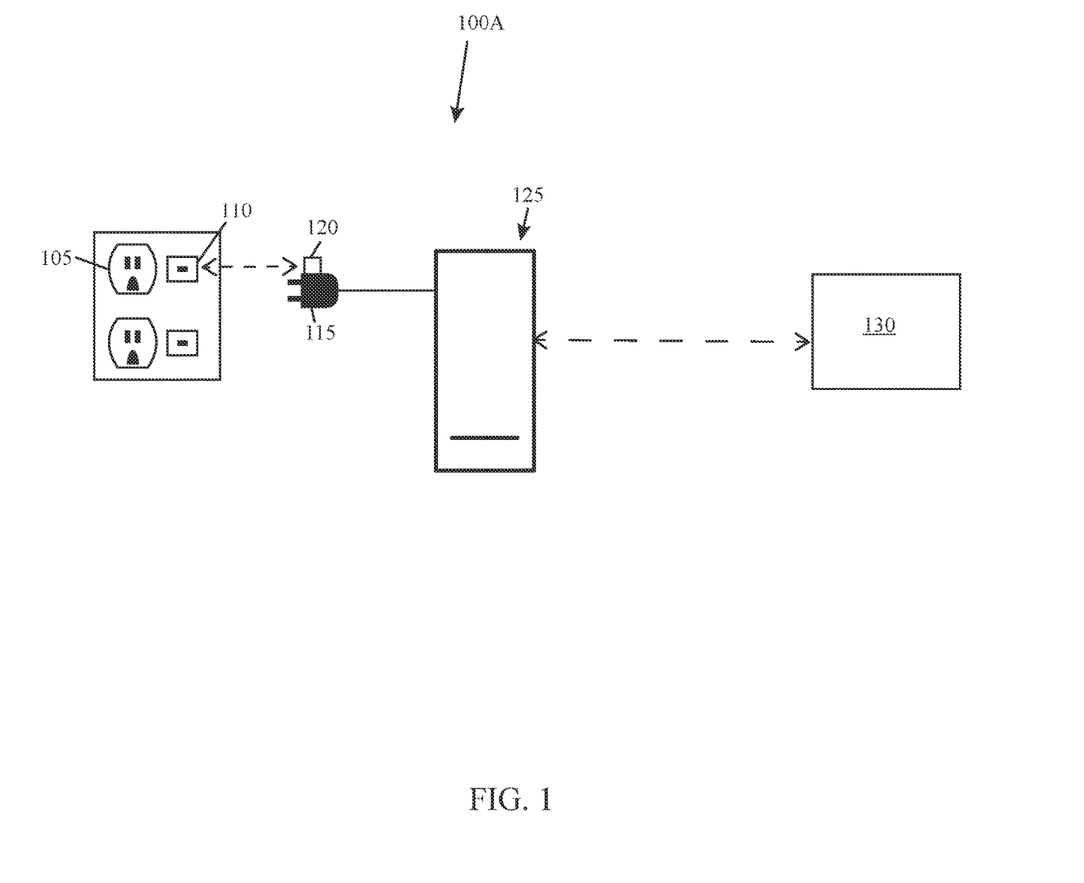
FIG. 1 illustrates a plug load management system for identifying, locating, monitoring, and/or controlling a single plug load, according to some aspects of the present disclosure.

FIG. 1 illustrates an exemplary PL management system 100A configured to locate and identify a single plug load 125 in order to, among other things, monitor and/or control the energy usage of a single plug load 125, according to some embodiments of the present disclosure. In this example, the PL system 100A includes a tag 110, assigned to a power-providing receptacle 105 (e.g., an electrical outlet), a reader 120, coupled to a connector 115 (e.g., an electrical plug) configured to fit into the receptacle 105 to electrically connect the plug load 125 to a power source, and a processor 130. The tag 110 may contain an identifier assigned to the receptacle 105 and stored in a database in the processor 130 such that the specific receptacle 105 may be determined from the identifier. The tag 110 may communicate an identifier to the reader 120, and the reader 120 may pass this identifier to the plug load 125. The plug load 125 then may communicate the identifier to the processor 130. The processor 130 may then determine to which receptacle 105 the plug load 125 is plugged in based on this identifier, effectively locating the plug load 125 within a building. The plug load 125 may also send self-identifying information (or metadata) about itself to the processor 130, including type of device, energy usage, and/or operating schedule of the plug load 125. The processor 130 may store this metadata and/or analyze this metadata to determine trends in the energy usage of the plug load 125. Based on the metadata and/or trends in the metadata, the processor 130 may be able to forecast or make predictions as to when the plug load 125 may be utilized or when it may be powered down to conserve energy. As needed based on energy budgets or total energy needs of the PL management system 100, the processor 130 may control the energy usage of the plug load 125 by sending instructions to the plug load 125 directly the plug load 125 to change its operating status to reduce its energy usage. The plug load 125 may change its behavior based on instructions from the processor 130.

Figure 2:
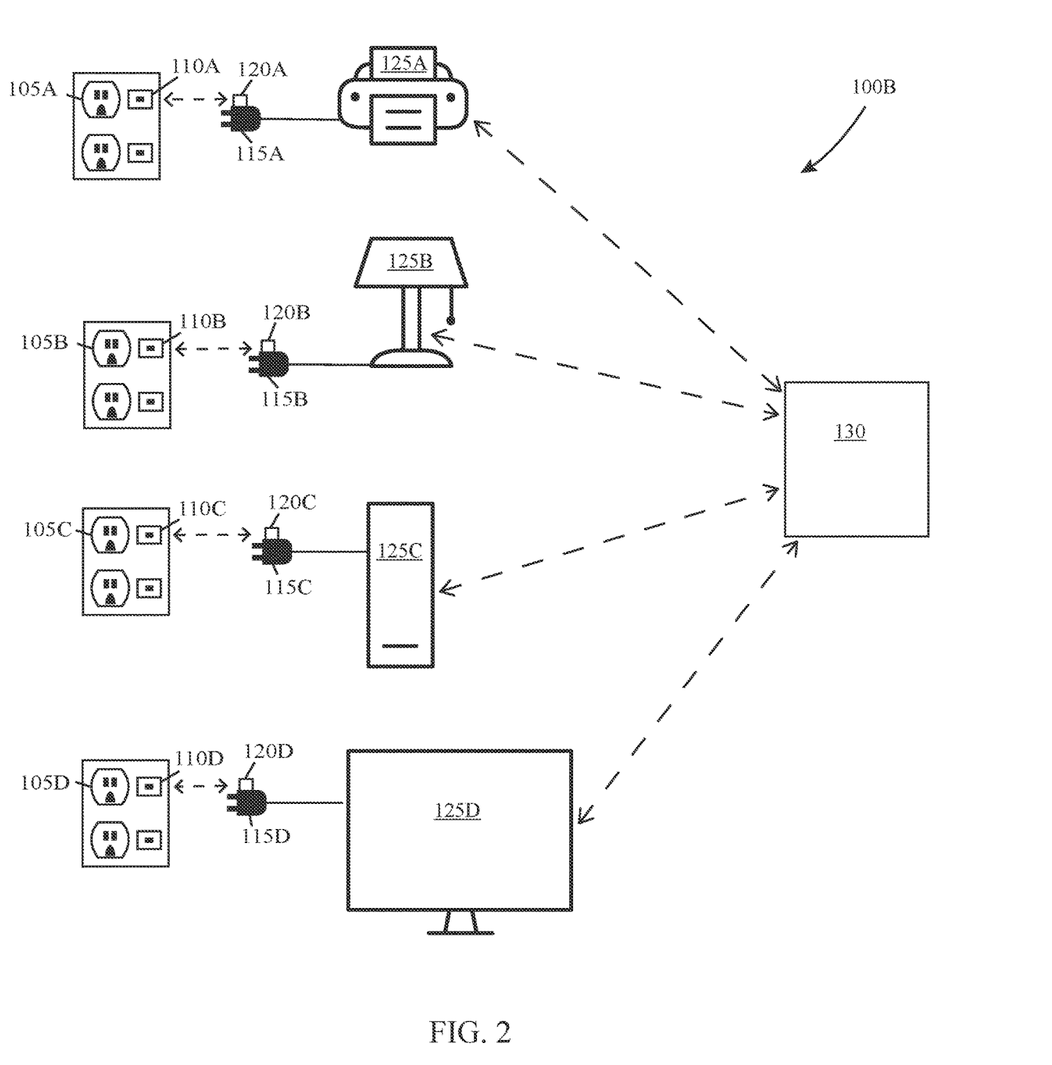
FIG. 2 illustrates a plug load management system for identifying, locating, monitoring, and/or controlling multiple plug loads, according to some aspects of the present disclosure.

Although the PL management system 100A shown in FIG. 1 illustrates a case where the PL management system 100A locates, identifies, monitors, and/or controls only a single plug load 125, this is for illustrative purposes only. Clearly, a PL management system 100 that locates, identifies, monitors, and/or controls a large number of plug loads 125 (e.g., hundreds or more) is where such a PL management system 100 is especially valuable. Thus, FIG. 2 illustrates a PL management system 100B configured to locate, identify, monitor, and/or control multiple plug loads 125 (four shown, 125A, 125B, 125C, 125D), according to some embodiments of the present disclosure. Regardless of the number of plug loads 125 contained in a particular PL management system 100B, each receptacle 105 will have an assigned identifier, which may be communicated by its associated tag 110 to a reader 120, which can convey that identifier to the respective plug load 125. The plug load 125 may communicate the identifier (as well as self-identifying information) to the processor 130. Based on this identifier, the processor 130 may pin-point the location and identity of the specific plug load 125 to its respective receptacle 105.

In some embodiments, the PL management system 100 is adaptive and can continue to identify, locate, monitor, and/or control a plug load 125 if it is moved to a different receptacle 105, based on the identifying information provided by the tag 110 attached to the receptacle 105 which is determined by the reader 120 and/or the plug load 125. For example, if plug load 125A in FIG. 2 were moved to receptacle 105B, the reader associated with plug load 125A would determine the identifier of this receptacle 105B and communicate that to the plug load 125A, which would send that new information to the processor 130. The processor 130 could then recognize that plug load 125A has moved from receptacle 105A to receptacle 105B and adjust accordingly.

In some embodiments, the tag 110 may be a radio frequency identification (RFID) tag, a barcode, or a microchip which may be attached to, connected to, or adhered to the receptacle 105. For example, in some embodiments, the tag 110 may be a RFID tag adhered to the outlet cover of an electrical outlet (i.e., the receptacle 105). In a PL system 100 having multiple plug loads 125 there may be multiple types of tags 110. Each tag 110 may have an identifier such as a unique identification (UID) number, sequence, code, and/or token and that identifier may be recorded in the processor 130, connecting the tag 110 with the location of the corresponding receptacle 105. That is, the identifier contained by the tag 110 may be associated with location of the corresponding receptacle 105 by the processor 130. This information may be recorded in the processor 130 when the building is built, when the PL management system 100 is installed, when the tags 110 are mounted, annually for maintenance, and/or as the building's electrical system is updated or modernized. This association of the identifier with the receptacle 105 allows the PL management system 100 to determine the location of the plug load 125 to its specific associated receptacle 105 and recognize a change in location of the plug load 125 if it is moved to a different receptacle 105.

In some embodiments, the reader 120 may be a RFID reader, a scanner, or a sensor capable of reading or receiving the identifier from the tag 110. For example, if the tag 110 is a RFID tag, then the reader 120 may be a RFID reader. The reader 120 may be attached to the plug load 125 and/or connector 115 or the functions of the reader 120 may be performed by the plug load 125. In a PL management system 100 having multiple plug loads 125, there may be multiple types of readers 120. In some embodiments, the reader 120 may communicate the identifier directly to the processor 130.

In some embodiments of the present disclosure, a plug load 125 may send a signal to a processor 130, providing metadata about that specific plug load 125. For example, the signal may identify the type of plug load 125 it is, e.g., light, appliance, electric device, etc. Such signal may include information about the "make and model" of the plug load 125, that is, the manufacturer, model number, year of manufacture, and/or serial number of the plug load 125. The plug load 125 may also report its regular operating or usage schedule, information related to its overall health, and/or other information as it is generated. The processor 130 may store the metadata provided by the plug load 125 and/or may review the metadata. Based on the metadata the processor 130 may identify trends in operating status, energy usage, and/or other performance metrics. With metadata from a plurality of plug loads 125 the processor 130 may determine which areas of a building are occupied at any given time (based on operating status or energy usage of plug loads 125 in that area of a building), determine the most important plug loads 125, and/or determine other things which are standard across the PL management system 100. The processor 130 may then send instructions to one or more of the plug loads 125 to affect their energy use. The instructions may be different to each individual plug load 125, based on the location of the individual plug load 125, the type of individual plug load 125, time of day/week/month/year, energy needs of the other plug loads 125 in the PL management system 100, cost of electricity, occupancy level of the building/wing/floor, and/or other factors.

In some embodiments, the receptacle 105 may be a power port, such as a traditional alternating current (AC) electrical outlet (may be US type A or type B or international style outlets), a universal serial bus (USB) outlet (Type A, Type B, or Type C), power over Ethernet (PoE) outlet, or other electrical socket or outlet which may be connected to a power supply or directly to a communication hub. In some embodiments, the receptacle 105 may be an electrical outlet, such as a traditional AC outlet with a voltage of 120-240 V and a frequency of 50-60 Hz. A PL management system 100 having multiple plug loads 125 may include multiple types of receptacles 105.

The connector 115 may be of the type that would mate appropriately with the receptacle 105. In some embodiments, the connector 115 may be an electrical plug (two or three pronged), a USB plug (Type A, Type B, or Type C), or a PoE plug. A PL management system 100 with multiple plug loads 125 may include multiple types of connectors 115.

In some embodiments, the plug load 125 may be an electrical appliance or power user, capable of self identifying using a communication protocol. The plug load 125 may be said to be a "smart device" capable of connecting, interacting, and/or communicating with other devices. For example, a plug load 125 may be a light source, computer and/or computer charging station, personal fan, window fan, refrigerator, microwave, blender, toaster, toaster oven, food processor, space heater, telephone, cellular phone or other electrical appliance charger, fax machine, printer, scanner, copier, computer monitor, television, audio/visual equipment, or another electrical appliance capable of communicating with at least one other electrical appliance or "smart device." The present disclosure relates to plug load management, meaning that the plug load 125 may be any device which is plugged in to a building's electrical outlets and capable of communicating with the processor 130. In some embodiments, the plug load 125 may be any power-using appliance or device within a building that is not a part of the heating, air conditioning, and ventilation (HVAC) system.

In some embodiments, the processor 130 may be a system capable of receiving information, transmitting information, searching a database, and/or solving logic problems. In some embodiments, the processor 130 may be a computer (i.e., hardware) and/or a computer program (i.e., software). The processor 130 may consist of multiple components to perform its various functions. For example, in some embodiments, the processor 130 may be a wireless fidelity (Wi-Fi) router and computer, the Wi-Fi router could facilitate communication to the plug loads 125 and the computer could perform the analytical functions (i.e., locate, identify, monitor, and/or control the plug loads 125). In some embodiments, the processor 130 may include a communications receiver/transmitter, a database, and or a computer server.

In some embodiments, the tag 110 and reader 120 may utilize near field communication (NFC) protocols, such as radio frequency identification (RFID), and/or other identification mechanisms. The plug loads 125 may utilize readers 120 capable of reading NFC, RFID, electrical connections, hub-based locations, and/or other identification mechanisms. RFID/NFC tags 110 and readers 120 may operate such that each receptacle 105 has a tag 110 and each connector 115 has a reader 120. Information may be passed between the tag 110 and reader 120 wirelessly.

In some embodiments, the reader 120 may transmit information about the tag 110 to the plug load 125 a wired communication. The reader 120 may be located on the connector 110 such that when the connector 115 is plugged in to the receptacle 105 the reader 120 can receive the identifier from the tag 110. A wired connection between the reader 120 and the plug load 125 may run substantially parallel to the cord between the connector 115 and the plug load 125. In some embodiments, a wired connection between the reader 120 and the plug load 125 may use the cord which connects the plug load 125 to the connector 115. In some embodiments, the reader 120 may transmit information to the plug load 125 using wireless communication. In some embodiments, the reader 120 may be a part of the plug load 125, meaning no separate component is needed.

In some embodiments, the present disclosure allows the plug loads 125 to communicate with the processor 130, meaning the plug loads 125 may transmit information to and receive information from the processor 130. The communication may be done wirelessly and/or through a wired communication means. Wireless communication may be done over Wi-Fi, Zigbee, Bluetooth, or other wireless networking standards, protocols, or communication mechanisms. A wired communication may be done using a phone or internet cable, a powerline, universal serial bus (USB) cable, power over ethernet (PoE), or other wired connections. The communication type may be selected by considering the data transfer rate, cybersecurity, reliability, distance limitations (either due to cord length or wireless capabilities), cost, adoption/integration with the appliances, communication hub, and/or plug load management system, standby power consumption, and standards for the internet of things (IoT). The communication from the plug load 125 to the processor 130 may include the plug load 125 type (such as manufacturer, make, model, category, class, series, and/or serial number), a unique identifier corresponding to the receptacle 105 the plug load 125 is plugged into (or the tag 110), power consumption information (such as power, voltage, and/or current, and/or trends of use of power, voltage, and/or current), and/or operating status (such as on, off, standby, actively in use, or inactive but still fully powered).

By facilitating communication between the plug loads 125 and the processor 130, the PL management system 100 allows for the plug loads 125 to perform safe shut-down procedures or be placed in standby mode when necessary. This allows all types of plug loads 125 to be controlled, such as plug loads 125 which must carefully be shut down, without damage to the plug loads 125. It also ensures that the control of the plug loads 125 is correct even if the plug loads 125 are moved throughout the building. The processor 130 may also receive dynamic data from the plug loads 125 such as changes in operating state, real-time energy usage, and/or other dynamic, real-time metadata, which may allow for tracking of plug load 125 utilization information. Communication between the plug loads 125 to the processor 130 allows for the plug loads 125 to be supplied power based on priority in situations when there is no need to power every plug load 125, such as in emergency situations (like brown outs or rolling black outs), during demand response events, or other situations where reducing total energy usage of the plug loads 125 is desired. In some situations, the processor 130 may control the energy use of plug loads 125 based on the power needs of the electrical grid (i.e., the processor 130 may respond to the demands of the grid). Control of the performance of plug loads 125 also allows the processor 130 to control the safety of the plug loads 125, for example, turning off a space heater or other heat-generating appliance when there are no occupants in the room/area of the building (which may be determined based on the usage data from other nearby plug loads 125).

Figure 3:
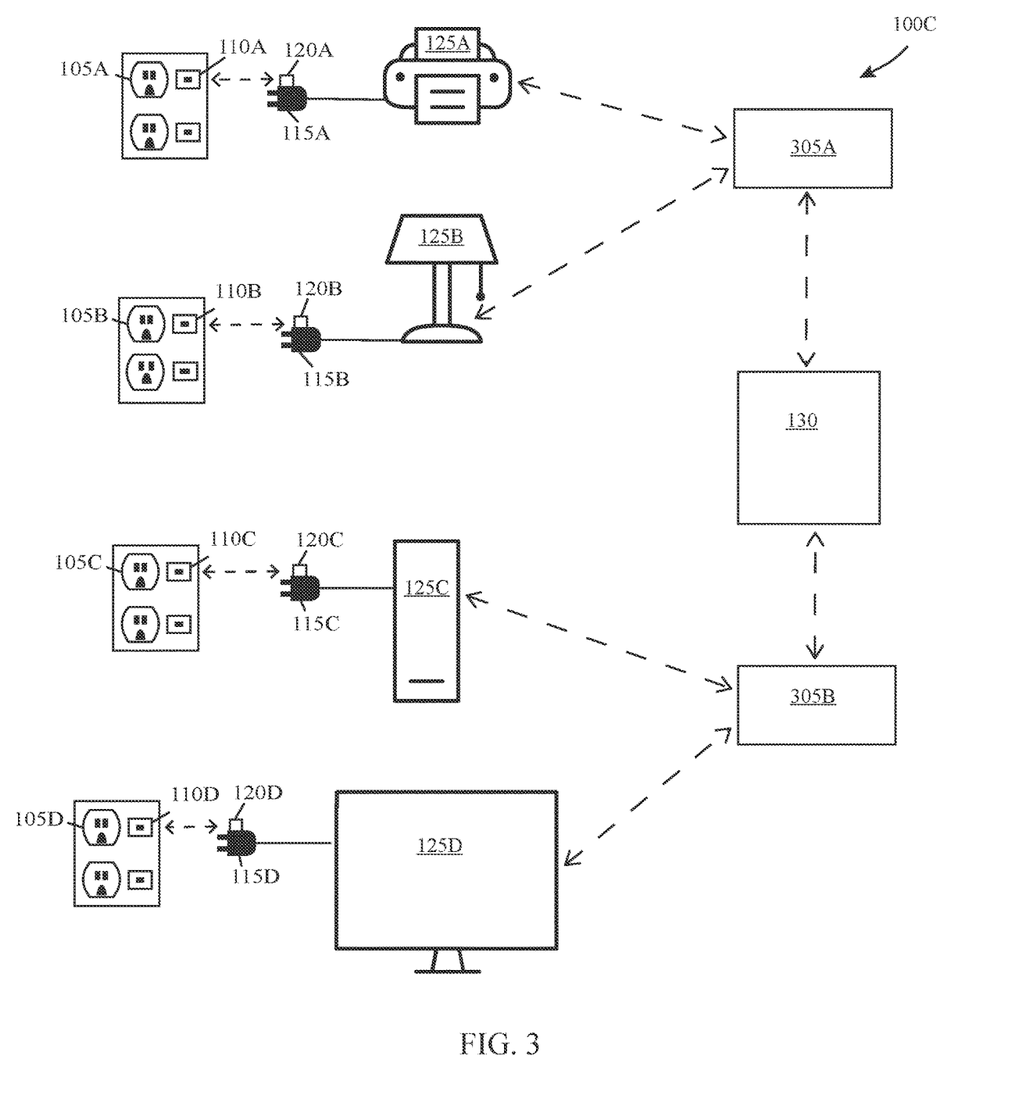
FIG. 3 illustrates a plug load management system for identifying, locating, monitoring, and/or controlling multiple plug loads and utilizing multiple hubs, according to some aspects of the present disclosure.

FIG. 3 illustrates a PL management system 100C having multiple hubs (shown as 305A and 305B) according to some aspects of the present disclosure. The PL management system 100C includes the components of the PL management system 100B shown in FIG. 2: receptacles 105 with associated tags 110, readers 120 connected to the connectors 115 of plug loads 125. The plug loads 125 may be grouped in subsets of the PL management system 100C. Each subset may communicate with a single hub 305, and each hub 305 may communicate with the processor 130. The processor 130 may then send instructions for an individual plug load 125 to the hub 305 corresponding to that plug load 125. The hub 305 may then relay that instruction to the individual plug load 125. The hubs 305 may act as a communication hub or relay station between a group of plug loads 125 (or a single plug load 125) and the processor 130. The hubs 305 may allow the PL management system 100C to cover a larger area or control plug loads 125 in different parts, wings, floors, units, and/or buildings of a building or complex. In some embodiments, a hub 305 may be able to act as a processor 130 for the plug loads 125 in its subset. That is, the hub 305 may send instructions to the plug loads 125 in its subset to control their energy usage without first communicating with the processor 130.

In some embodiments, the hub 305 may communicate the location of several plug loads 125 to the processor 130. The PL management system 100D shows only two wireless hubs 305A and 305B, but any number of wireless hubs may be used. The PL management system 100D shows only two plug loads 125 connected to a single hub 305, but a hub 305 could communicate with any number of plug loads 125. The PL management system 100C may cover a building with multiple rooms, wings, and/or floors, or a complex of buildings and/or units. A hub 305 may be in each room, wing, floor, and/or building of the PL management system 100C. The plug loads 125 may communicate with the hub 305 through a wired connection or using wireless communication. In some embodiments, the plug loads 125 connected to a single hub 305 may not all be connected to the hub 305 in the same way (i.e., one plug load 125 may be connected to the hub 305 wirelessly, and another plug load 125 may be connected to the hub 305 through a wired connection).

In some embodiments, a hub 305 may be substantially similar to a processor 130. A hub 305 may be a system capable of receiving information, transmitting information, searching a database, and/or solving logic problems. In some embodiments, a hub 305 may be a router (for example, a Wi-Fi router) or signal transmitter/receiver for directing communications between plug loads 125 and the processor 130. In some embodiments, a hub 305 may be a Wi-Fi router and a computer.

In some embodiments, the communication method between the plug load 125 and the hub 305 may be the same communication method as used between the hub 305 and the processor 130. In other embodiments, the communication method between the plug load 125 and the hub 305 may be a different communication method than the communication method used between the hub 305 and the processor 130. The communication between the hub 305 and the processor 130 may be done wirelessly or through a wired connection.

Figure 4:
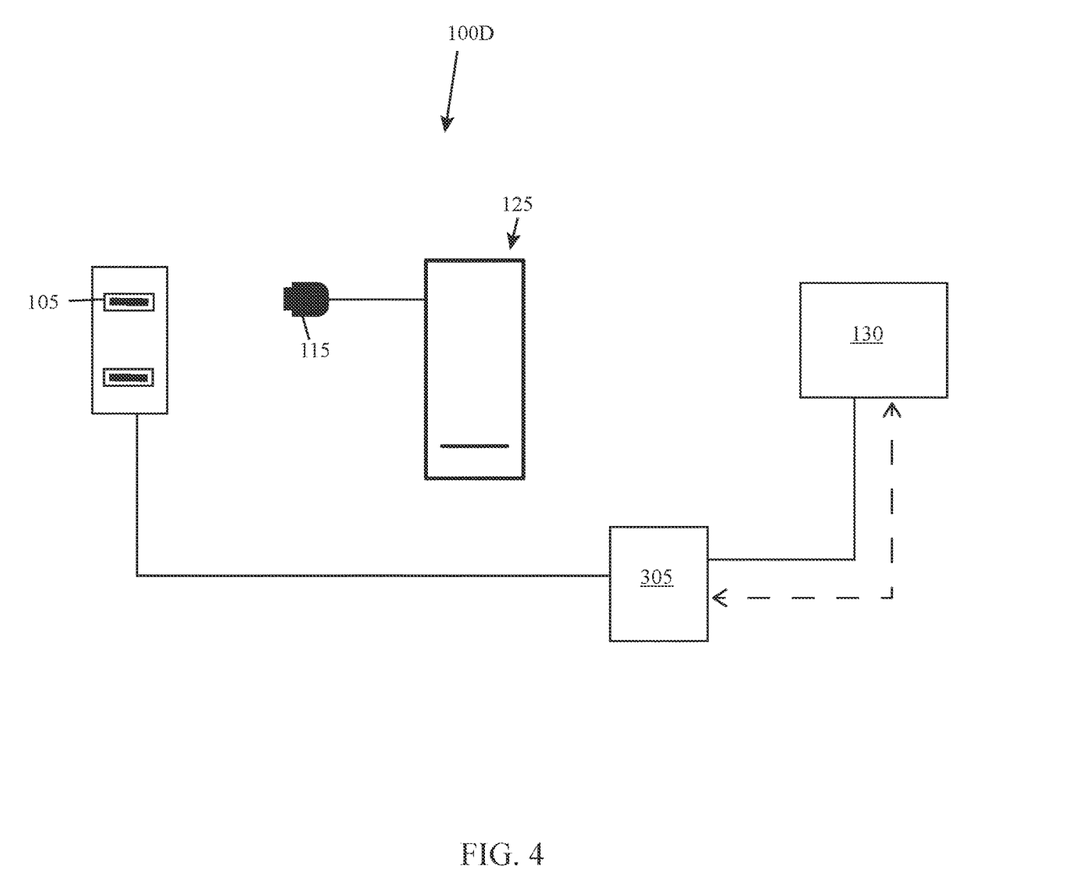
FIG. 4 illustrates a plug load management system for plug loads having universal serial bus (USB) or power over ethernet (PoE) connectors, according to some aspects of the present disclosure.

FIG. 4 illustrates a PL management system 100D using wired communication according to some aspects of the present disclosure. The PL management system 100D includes a plug load 125 with a universal serial bus (USB) or power over ethernet (PoE) connector 110 for plugging into a USB or PoE receptacle 105, a processor 130, and (in some embodiments) a hub 305 for relaying information between the plug load 125 and the processor. Note that the PL management system 100D as shown in FIG. 4 does not include a tag 110 or a reader 120, as the functions of these components may be performed by the receptacle 105 and/or the plug load 125. The connector 110 may be a USB or PoE plug and the receptacle 105 may be a corresponding USB outlet or PoE outlet.

Both USB and PoE cables may transfer both power and data in the same connection. In some embodiments of the present disclosure, as shown in FIG. 4, a USB or PoE connector 115 may receive both power and data from a corresponding USB or PoE receptacle 105. Using this data, in a PL management system 100D as shown in FIG. 4, the receptacle 105 may communicate information including an identifier for the receptacle 105 and/or the location of the receptacle to the plug load 125. The plug load 125 may then communicate through the USB or PoE wiring to a hub 305 and/or the processor 130. Such a communication may include the identifier, the location of the receptacle 105, and/or other information about the plug load 125.

In the embodiment shown in FIG. 4, the receptacle 105 may be connected to a hub 305. The connection between the receptacle 105 and the hub 305 may be done with electrical wires, USB cables, PoE cables, or other means. In some embodiments, the hub 305 may communicate with the processor 130. The communication between the hub 305 and the processor 130 may be over a wired connection or using a wireless communication scheme. The hub 305 may then communicate with the processor 130. Then, the processor 130 may send instructions to control the energy usage of the plug load 125 to the hub 305, and the hub 305 may then send those instructions to the plug load 125 through the receptacle 105 and the connector 115. The hub 305 can act as a communication hub or relay station between the plug load 125 and the processor 130.

Figure 5:
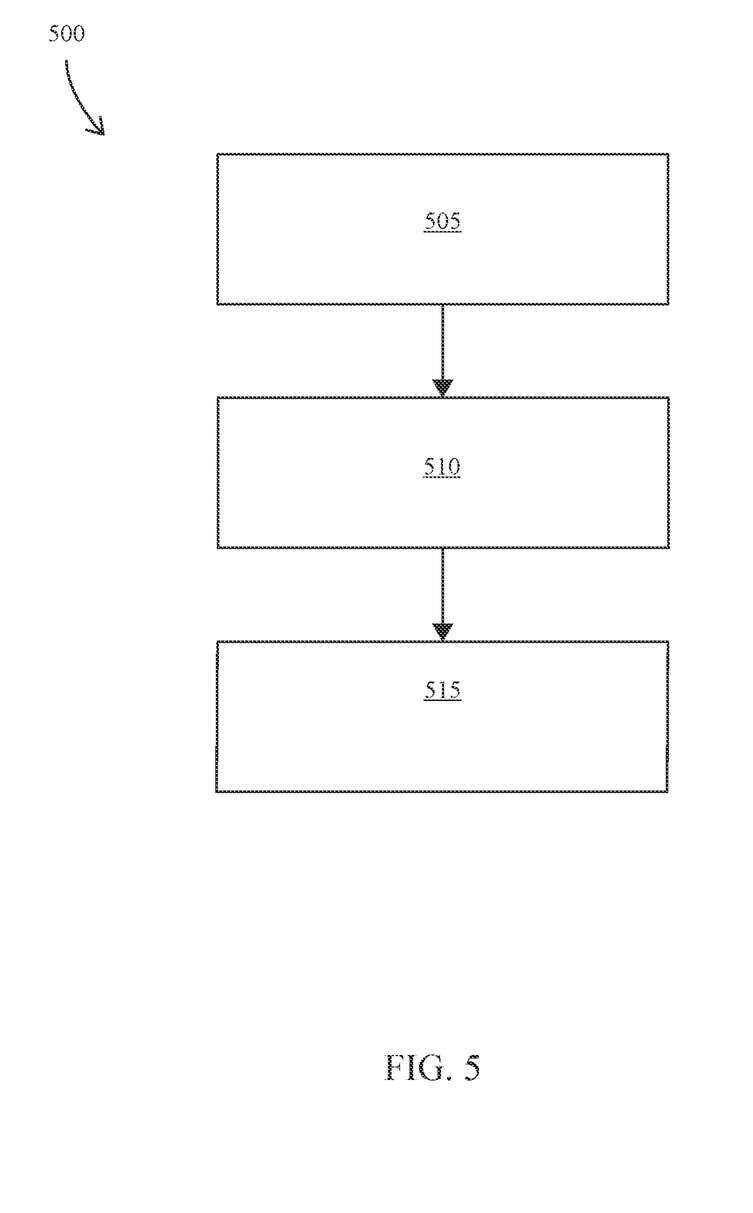
FIG. 5 illustrates a method of performing plug load management, according to some aspects of the present disclosure.

FIG. 5 illustrates a method of performing plug load management according to some aspects of the present disclosure. The method 500 may include providing 505 an identifier representing the receptacle 105 and/or the location of a receptacle 105. This may be done by a reader 120 configured to receive a signal from a tag 110 that is paired with a receptacle 105 being utilized by a plug load 125. The tag 110 may transmit, among other things, an identifier to the reader 120 using a form of wireless communication, such as near-field communication. Providing 505 may be performed using radio frequency identification (RFID) communication between the tag 110 and the reader 120. Providing 505 the identifier (and/or other data) may be achieved when the plug load 125 is initially plugged in to the receptacle 105.

The method 500 may include identifying the location of the receptacle 105 based on the identifier. A processor 130 may receive a communication from the plug load 125 and/or the reader 120, which may include the identifier. The processor 130 may have a database which includes the identifier and its corresponding receptacle 105 and/or location of a receptacle 105. The database may be established when the PL management system 100 is initially installed or updated. A processor 130 may search the database for the identifier and from the database determine the location of the receptacle 105. In some embodiments of the present disclosure, the communication to the processor 130 which may include the identifier may also include self-identifying metadata regarding the plug load 125.

The method 500 may include the processor 130 sending 515 an instruction to at least one plug load 125 to control the energy use of the plug load 125. In some embodiments, the processor 130 may determine an energy budget for the plug loads 125 being monitored by the PL management system and may determine the energy allocation for each individual plug load 125 based on that energy budget. Among other things, a processor 130 may determine which plug loads 125 are unnecessary or lower priority (based on energy usage data provided by the plug loads 125 to the processor 130) and may instruct those plug loads 125 to reduce their energy use by entering a power-save mode, a standby mode, or by powering off. A processor 130 may collect data from the plug loads 125 about their typical energy usage and make priority lists of utilization of plug loads 125 from that data. The processor 130 may store historical energy usage and or other metadata about the plug loads 125 for analysis and/or forecasting. For example, a processor 130 may collect data recognizing that certain plug loads 125 are used less regularly, and when the processor 130 is attempting to reduce the energy use of multiple plug loads 125 being the processor 130 may instruct the less-regularly used plug loads 125 to power off. A processor 130 may be able to predict when a specific plug load 125 will be needed based on its past usage.

In some embodiments, the PL management system 100 may have semantic interoperability allowing multiple systems, platforms, or programs to understand the information (and/or the metadata) provided by the plug loads 125 to the processor 130. For example, the PL management system 100 may be capable of conveying semantics using existing open source semantic interoperability initiatives such as Project Haystack, Brick Schema, and/or ASHRAE 223P. The database housed within the processor 130 including the tags 110 and corresponding receptacles 105 and/or identification of the corresponding electric circuit and feeding panels may be provided in semantic formats. This may allow the PL management system 100 to communicate and/or integrate with other building control systems.

In one or more examples, at least some of the techniques described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

The invention claimed is:

1. A system for plug load management, the system comprising:
a tag connected to a receptacle comprising an identifier assigned to the receptacle;
a reader connected to the plug load; and
a processor; wherein:
the plug load is connected to the receptacle,
the tag is configured to provide the identifier to the reader,
the plug load is configured to send the identifier to the processor,
the processor is configured to determine the receptacle the plug load is plugged in to based on the identifier.

2. The system of claim 1, wherein:
the tag comprises a radio frequency identification (RFID) tag, and
the reader comprises a RFID reader.

3. The system of claim 1, wherein:
the receptacle comprises an electrical outlet.

4. The system of claim 1, wherein:
the receptacle comprises a universal serial bus (USB) outlet.

5. The system of claim 1, wherein the processor contains a database which associates the identifier with the receptacle.

6. The system of claim 1, wherein the plug load comprises a smart device capable of communicating with the processor using a form of wireless communication.

7. The system of claim 1, wherein the processor is configured to send an instruction to the plug load.

8. A system for plug load management, the system comprising:
a plug load having a power over ethernet (PoE) connector;
a PoE receptacle having an identifier; and
a processor; wherein:
the plug load is connected to the PoE receptacle via the PoE connector,
the PoE receptacle is configured to communicate the identifier to the plug load,
the plug load is configured to communicate the identifier to the processor, and
the processor is configured to determine the receptacle based on the identifier.

9. The system of claim 8, wherein the processor contains a database which associates the identifier with the receptacle.

10. The system of claim 8, wherein the plug load comprises a smart device configured to communicate with the processor using a form of wired communication.

11. the system of claim 8, wherein the processor is configured to send an instruction to the plug load.

12. A method of plug load management, the method comprising:
providing an identifier via a tag to a reader when a plug load is connected to a receptacle;
communicating the identifier to a processor via the plug load;

identifying the receptacle to which the plug load is connected based on the identifier; and sending an instruction to the plug load.

13. The method of claim 12, wherein the providing comprises using a form of near field communication (NFC).

14. The method of claim 13, wherein:

the form of NFC comprises radio frequency identification (RFID).

15. The method of claim 12, further comprising before the providing:

recording the identifier and the receptacle in a database within the processor.

16. The method of claim 15, wherein the determining comprises:

receiving the identifier; and searching the database for the identifier; wherein:

the database connects the identifier to the receptacle.

17. The method of claim 15, wherein the plug load comprises a smart device capable of communicating with the processor wirelessly.

18. The method of claim 12, wherein the sending comprises:

directing the plug load to reduce its energy usage.

19. The method of claim 12, wherein the sending comprises:

directing the plug load to power off.

20. The method of claim 12, wherein the sending comprises:

directing the plug load to enter standby mode.

* * * * *